Nov. 11, 1952  E. MEIERJOHAN  2,617,611
FISHING REEL
Filed April 7, 1948
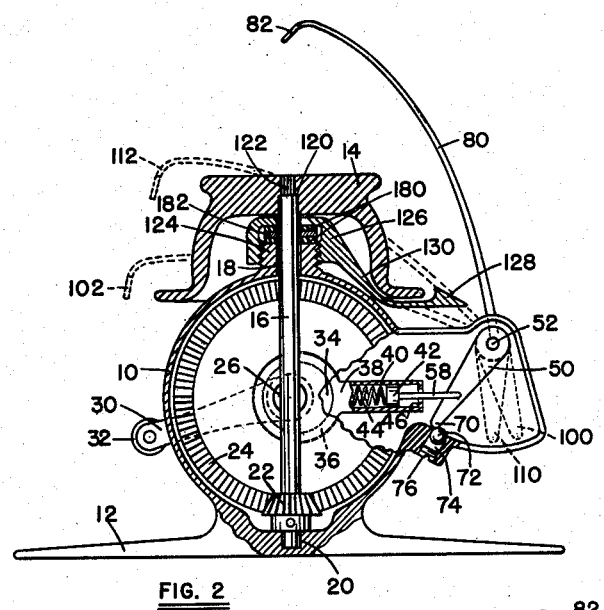
FIG. 2
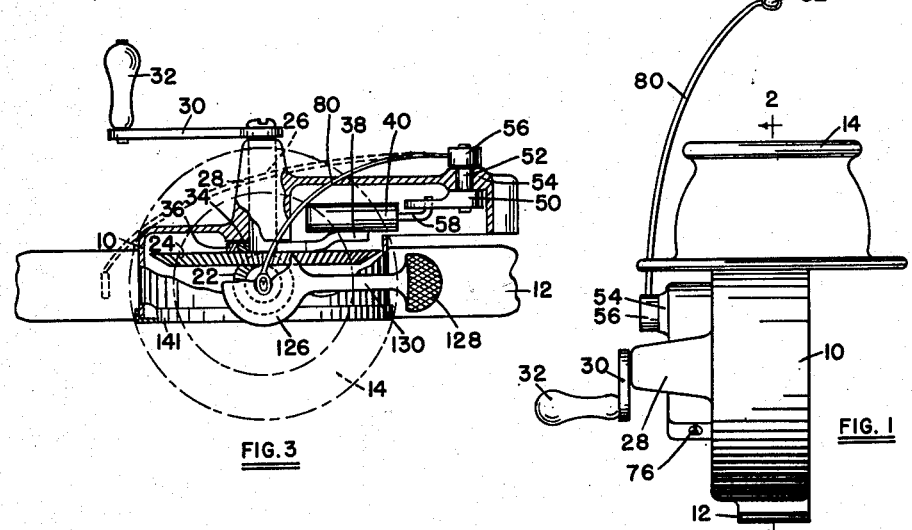
FIG. 3
FIG. 1
INVENTOR.
ERNEST MEIERJOHAN
BY
J. Warren Kinney, Jr.
ATTORNEY Patented Nov. 11, 1952

2,617,611

UNITED STATES PATENT OFFICE 2,617,611

FISHING REEL

Ernest Meierjohan, Cincinnati, Ohio, assignor of fifty per cent to J. Warren Kinney, Jr., Cincinnati, Ohio, Application April 7, 1948, Serial No. 19,619

7 Claims. (Cl. 242—84.4)

This invention relates to casting reels.

An object of the invention is to provide a casting reel which combines the advantages of the drum type reels with spinning type reels.

Another object of the invention is to provide a reel having a line spool, the axis of rotation of which is in a plane at substantial right angles with the mean axis of the rod assembly, and which includes a line guide shiftable to one or the other of two normal positions for converting the operating characteristics of the line spool to those of a drum type reel or a spinning type reel. When the line guide is positioned for converting the spool to a drum type reel, it is located in tangential relationship with the spool, that is, the spool must be rotated to effect a winding or unwinding of the line thereon or therefrom; however, when the guide is positioned for converting the spool to a spinning type reel, it is located in substantial axial alignment with the axis of rotation of the spool for enabling the line to be peeled off the end of the stationary spool, thereby eliminating all possibility of backlash incident to a casting operation.

A further object of the invention is to provide a reel having the hereinabove described characteristics wherein the line guide is pivotally mounted for quick, easy shifting from one to the other of its two normal positions, thereby enabling an angler to readily flip the line guide from a casting position to rewinding position.

Still another object of the invention is to provide a reel having the hereinabove described characteristics, and which is so constructed that line being peeled from the spool incident to a cast may be effectively controlled by the finger of the user of the device. It will be appreciated that since the spool does not rotate during casting, there will be no inertia forces of the reel to be dealt with.

Still a further object of the invention is to provide a fishing reel having the desirable qualities of a spinning type casting reel along with those of a good fishing reel.

Another object of the invention is to provide a lightweight, highly efficient reel which will enable the users to obtain long, accurate casts using lightweight lures.

Another object of the invention is to provide a reel having the hereinabove described characteristics wherein the line guide may be caused to oscillate in a vertical plane incident to rotation of the spool for wrapping the line on the spool in a manner to facilitate endwise removal of the line from the spool incident to casting.

Another object of the invention is to provide a reel which is provided with a positive acting brake for controlling the operating characteristics of the spool from a thumb lever conveniently located adjacent the handle of a fishing rod.

Still another object of the invention is to provide a reel having the hereinabove described characteristics which is adapted to be mounted on the top of conventional fishing rod handles in the same manner as the conventional drum type reels, thereby placing the reel in an accessible, easy-to-use position.

Still another object of the invention is to provide a reel which is constructed in such a manner that pull of the line is applied tangentially to the spool, which pull will be resisted by the spool spindle which is disposed at substantial right angles with the longitudinal axis of the rod, thereby effectively precluding loss or damage of the spool incident to fishing operations.

Still another object of the invention is to provide a reel having a line spool which may be easily and quickly removed and replaced with the same or another spool thereby enabling fishermen to change lines without having to resort to the use of separate reels and/or without having to rewind a new line on the spool of a standard reel.

Still a further object of the invention is to provide a reel which will fit any standard fishing rod handle, which includes a minimum of parts and which is positive and foolproof in operation.

These and other objects are attained by the means described herein and as disclosed in the accompanying drawings, in which:

Fig. 1 is a front view of a casting reel embodying the teachings of the present invention.

Fig. 2 is a vertical section taken on line 2—2 of Fig. 1.

Fig. 3 is a top view of the device of Fig. 1 with the spool removed and parts of the housing cut away to reveal the structural details of the device.

With reference to the drawings, my reel comprises a housing 10 provided with a base or mounting plate 12 by which the reel may be mounted to any of the various standard handles presently on the market, and such as, by way of example, is illustrated in the drawings comprising part of my United States Patent No. 2,495,980, dated January 31, 1950.

A line spool 14 is secured to and carried by spindle 16 rotatably journaled in the housing at 18 and 20, see Fig. 2. A spur gear 22 secured in driving relationship with spindle 16 meshes with drive gear 24 secured in driven relationship with drive shaft 26 journaled in boss 28. The outer end of this shaft may be provided with a crank arm 30 including a handle portion 32.

A cam 34 is secured to shaft 26 for rotation therewith, said cam being engaged by a yoke strap 36 having formed integrally therewith an arm 38 to which a tubular casing 40 is secured for movement therewith.

With reference now to Fig. 2, it will be noted that a piston 42 is slidably mounted within casing 40, said piston being normally urged outwardly by means of a spring 44. The outer end of the casing may be provided with suitable stops 46 for limiting the maximum outward travel of the piston relative to the casing. The inner end of the casing may be closed to provide an abutment for the inner end of the spring.

Lever 50 is secured to a stub shaft 52 journaled in boss 54, and to the other end of which a collar 56 is secured. Line guide 80, the free outer end of which terminates in line loop 82, is secured to and carried by collar 56, Fig. 3.

Piston 42 is secured to lever 50 by means of a connecting rod 58, one end of which is fixed to the piston and the other end of which pivotally engages the lever intermediate its length, as illustrated in Fig. 2.

With particular reference now to Fig. 2, it will be noted that the lower or free end 70 of lever 50 is disposed on the left side of a spring loaded ball 72 normally urged outwardly and upwardly by means of spring 74 which abuts plug 76. When in this relationship, the line guide is in a fully raised or elevated position and the line loop 82 is in substantial alignment with or on the axis of spindle 16, the axis of rotation of spool 14, thereby enabling line wrapped on the spool to be pulled or peeled endwise therefrom while the spool is stationary, thereby positively eliminating all possibility of occurrence of backlash.

When the line guide is disposed in its fully raised or elevated position, piston 42 will be shifted to the left against the counter force of spring 44 by an amount sufficient to enable the piston to remain stationary as the casing is caused to oscillate incident to rotation of cam 34. In other words the piston has been shifted to a neutral, non-driven position, wherefore rotation of crank arm 30 will not effect or move the line guide, which will be positively yet yieldably maintained in its fully raised position by spring 44 which functions to maintain the lower end 70 of lever 50 in contact with detent ball 72.

If suitable force be applied in a counterclockwise direction to guide arm 80, the lower end of lever 50 will be forced to the right over detent ball 72 and piston 42 will be shifted to the outer end of the casing where it will be yieldably maintained in abutment with stops 46 by means of spring 44. The lever will then assume the position indicated by the numeral 100, and the line guide will assume the position indicated by the broken lines 102. Rotation of cam 34 will impart an oscillatory motion to the lever between the position indicated in broken lines by the numerals 100 and 110, which represents the overall stroke of the cam and which determines the limits of oscillation of the line guide when in a fully lowered or tangential position with reference to spool 14. When lever 50 is at 110 the line guide will assume the relative position indicated by the broken outline 112.

Spool 14 is preferably constructed in such a manner as to facilitate its removal from or attachment to spindle 16, and to this end the outer end of the spindle may be provided with a shoulder 120 and a splined portion 122 for engaging complementary portions of the spool.

In order to provide simple, yet highly effective means for braking rotation of spindle 16, I have provided an externally threaded boss 124 which is engageable by an internally threaded cap 126 having an actuating lever 130 formed therewith and terminating in a thumb rest 128. Two brake discs of compressible material, such as leather, fiber, or the like, denoted generally by the numeral 130 circumscribe the spindle, and may, if desired, be separated by a metallic washer 182. An effective braking action may be imparted to the spindle when the thumb rest is moved in a clockwise direction to tighten cap 126 onto boss 124 for compressing the brake disks and causing them to expand and frictionally engage spindle 16.

If desired, a cap member indicated generally by the numeral 141, Fig. 3, may be provided in overlapping relationship with and for closing the open side of housing 10, thereby completely housing the gears.

It will be observed that spindle 16 is disposed at right angles to the longitudinal axis of base plate 12, whereby the pull of the line wrapped on spool 14 will, when the line guide 80 is in a lowered position, tangentially engage the spool carried by the spindle, wherefore the pull on the line will be resisted by the inherent strength characteristics of housing 10, and by the efficiency of the brake.

When the line guide has been shifted to its fully raised or elevated position, the line wound on spool 14 will be peeled off the upper end of the spool as fast as the lure attached to the end of the line can pull it. After a cast has been completed, the line guide 80 may be quickly flipped to a lowered position by the thumb of the user, and without necessitating the user of the device from changing the grip on the handle of the fishing rod.

It will be further noted that my reel is adapted to be located on top of a standard fishing handle in the same position in which the drum type reels are presently mounted, thereby enabling my reel to be easily adapted to existing equipment and further enabling the user to quickly and easily become accustomed to its operating characteristics. In the preferred embodiment of the invention, spool 14 may be quickly removed from spindle 16 to enable replacement with another similar spool which may, if desired, be provided with a different diameter or strength line, thereby enabling the user of the device to quickly change line spools without having to remove the reel housing from the rod handle. There is no likelihood of accidental or unintentional disengagement of a spool from its spindle 16, since those forces which tend to rotate the spool are applied tangentially to it, or at substantial right angles to the axis of the spindle. There is no axial thrust or pull on the spool during those periods of time when the line guide is in a raised position for effecting an endwise removal of the line from the spool.

What is claimed is:

1. A reel comprising a housing including a base plate, a line spool spindle disposed at substantial right angles with the longitudinal axis of said base plate, a line spool constructed and arranged to be received in supporting driven relationship on said spindle and in overhanging relationship with said housing, means disposed between said spool and housing circumscribing said spindle and mounted for movement about the axis of said spindle to frictionally engage said spindle for resisting rotation thereof, said means including an actuator lever formed to project outwardly from and below said spool.

2. A casting reel comprising a housing including a base plate, a line spool spindle journaled in and extending diametrically through said housing, one end of said spindle projecting outwardly from and beyond said housing opposite said base plate, means including a rotatable drive shaft for imparting a rotary motion to said spindle, a stub shaft journaled in said housing having its axis substantially parallel with the axis of said drive shaft, a line-guide arm secured to said stub shaft with the free end of said arm terminating in a line eyelet, said stub shaft rotatable between two normal positions, one for disposing said arm in an elevated position for locating the eyelet in substantial axial alignment with the free outer end of said spindle, the other for disposing said arm in a lowered position for locating the eyelet in substantial parallelism with said spindle, and means operable for translating rotary motion of said drive shaft to oscillatory movement of said stub shaft only during those periods of time when said arm is in the lower of its two normal positions.

3. A casting reel comprising a housing including a base plate, a line spool spindle journaled in and extending diametrically through said housing, one end of said spindle projecting outwardly from and beyond said housing opposite said base plate, a line spool receivable on and in supported driven relationship with said spindle, means including a rotatable drive shaft for imparting a rotary motion to said spindle, a stub shaft journaled in said housing having its axis substantially parallel with the axis of said drive shaft, a line-guide arm secured to said stub shaft with the free end of said arm terminating in a line eyelet, said stub shaft rotatable between two normal positions, one for disposing said arm in an elevated position for locating the eyelet in substantial axial alignment with the free outer end of said spindle, the other for disposing said arm in a lowered position for locating the eyelet in substantial parallelism with said spindle, and means operable for translating rotary motion of said drive shaft to oscillatory movement of said stub shaft only during those periods of time when said arm is in the lower of its two normal positions.

4. A casting reel comprising a housing including a base plate, a line spool spindle journaled in and extending diametrically through said housing, one end of said spindle projecting outwardly from and beyond said housing opposite said base plate, means including a rotatable drive shaft for imparting a rotary motion to said spindle, a stub shaft journaled in said housing having its axis substantially parallel with the axis of said drive shaft, a line-guide arm secured to one end of said stub shaft with the free end of said arm terminating in a line eyelet, a lever secured to the other end of said stub shaft, said stub shaft rotatable between two normal positions, one for disposing said arm in an elevated position for locating the eyelet in substantial axial alignment with the free outer end of said spindle, the other for disposing said arm in a lowered position for locating the eyelet in substantial parallelism with said spindle, latch means engageable by said lever when said arm is in elevated position for maintaining it in elevated position and against accidental or unintentional movement to its lowered position, and means operable for translating rotary motion of said drive shaft to oscillatory movement of said stub shaft only during those periods of time when said arm is in the lower of its two normal positions.

5. A casting reel comprising a housing including a base plate, a line spool spindle journaled in and extending diametrically through said housing, one end of said spindle projecting outwardly from and beyond said housing opposite said base plate, means including a rotatable drive shaft for imparting a rotary motion to said spindle, a stub shaft journaled in said housing having its axis substantially parallel with the axis of said drive shaft, a line-guide arm secured to one end of said stub shaft with the free end of said arm terminating in a line eyelet, a lever secured to the other end of said stub shaft, said stub shaft rotatable between two normal positions, one for disposing said arm in an elevated position for locating the eyelet in substantial axial alignment with the free outer end of said spindle, the other for disposing said arm in a lowered position for locating the eyelet in substantial parallelism with said spindle, latch means engageable by said lever when said arm is in elevated position for maintaining it in elevated position and against accidental or unintentional movement to its lowered position, and means operable for translating rotary motion of said drive shaft to oscillatory movement of said stub shaft only during those periods of time when said arm is in the lower of its two normal positions, said last mentioned means comprising a cam in driven relationship with said drive shaft, a cam follower, and means yieldably interconnecting said cam follower with said lever.

6. A casting reel comprising a housing including a base plate, a line spool spindle journaled in and extending diametrically through said housing, one end of said spindle projecting outwardly from and beyond said housing opposite said base plate, a line spool receivable on and in supported driven relationship with said spindle, means including a rotatable drive shaft for imparting a rotary motion to said spindle, a stub shaft having its axis substantially parallel with the axis of said drive shaft journaled in said housing, a line-guide arm secured to said stub shaft with the free end of said arm terminating in a line eyelet, said stub shaft rotatable between two normal positions, one for disposing said arm in an elevated position for locating the eyelet in substantial axial alignment with the free outer end of said spindle, the other for disposing said arm in a lowered position for locating the eyelet in substantial parallelism with said spindle, means operable for translating rotary motion of said drive shaft to oscillatory movement of said stub shaft only during those periods of time when said arm is in the lower of its two normal positions, means circumscribing said spindle and mounted for movement about its axis to frictionally engage said spindle for selectively resisting rotation thereof, and an actuator lever secured to said last mentioned means.

7. A casting reel comprising a housing including a base member, a line spool spindle journaled in and extending into the housing, one end of said spindle projecting outwardly from and beyond said housing, a spool for fishing line mounted on the outwardly projecting portion of the spindle, means including a rotatable drive shaft for imparting rotary motion to said spindle and spool, an arm carrying a closed line-guide eyelet on an extended portion, a second shaft secured to an end of the arm, means journaling said second shaft in said housing with its axis parallel to the drive shaft and for rotation between two normal positions, the first for disposing the arm in a position to locate the eyelet in substantial axial alignment with the free outer end of the spindle for guiding line off the end of the spool, and the second for disposing the arm in a position to locate the eyelet in an area transverse to said spool to guide line onto the spool, and means becoming operable when the arm is moved to the second position for translating rotary motion of the drive shaft to oscillatory movement of said second shaft to reciprocate the eyelet and traverse line on the spool during winding.

ERNEST MEIERJOHAN.

REFERENCES CITED

The following references are of record in the file of this patent:

UNITED STATES PATENTS

| Number | Name | Date |
|---|---|---|
| 161,314 | Winans et al. | Mar. 23, 1875 |
| 1,625,988 | Dice | Apr. 26, 1927 |
| 1,635,629 | Marcy | July 12, 1927 |
| 2,179,413 | Kolosso | Nov. 7, 1939 |

FOREIGN PATENTS

| Number | Country | Date |
|---|---|---|
| 8,517 of 1910 | Great Britain | Jan. 26, 1911 |
| 363,597 | Great Britain | Dec. 24, 1931 |
| 380,254 | Great Britain | Sept. 15, 1932 |
| 828,000 | France | Feb. 2, 1938 |